United States Patent [19]  [11] 4,424,050
Sato  [45] Jan. 3, 1984

[54] OIL-SEALED ROLLER CHAIN

[75] Inventor: Yoshimasa Sato, Ishikawa, Japan

[73] Assignee: Enuma Chain Manufacturing Co., Ltd., Japan

[21] Appl. No.: 245,881

[22] Filed: Mar. 20, 1981

Related U.S. Application Data

[63] Continuation of Ser. No. 56,841, Jul. 12, 1979.

[51] Int. Cl.³ .............................................. F16G 13/02
[52] U.S. Cl. .................................................... 474/231
[58] Field of Search ............... 474/228, 229, 230, 231, 474/232, 233, 234, 235; 29/525

[56] References Cited

U.S. PATENT DOCUMENTS

| | | | |
|---|---|---|---|
| 1,289,408 | 12/1918 | Davis | 305/11 |
| 3,055,670 | 9/1962 | Sampson | 277/168 |
| 3,068,712 | 12/1962 | Kuntzman | 474/231 |
| 3,447,837 | 6/1969 | Deli et al. | 474/230 |
| 3,616,707 | 11/1971 | Ivashkov et al. | 474/230 |
| 4,094,515 | 6/1978 | Araya et al. | 474/231 |
| 4,126,359 | 11/1978 | Holze | 29/525 |

Primary Examiner—Lawrence J. Staab
Assistant Examiner—Andrew J. Rudy
Attorney, Agent, or Firm—McGlew and Tuttle

[57] ABSTRACT

A roller chain, having an elastic annular member being fitted adjacent each end of a pin and between a pin link plate and a roller link plate for sealing lubricating oil present in the space between the pin and the bushing, comprises a bushing extended on each end thereof so as to form an extended portion projecting outwards from the roller link plate by a length slightly smaller than the thickness of said annular member, said extended portion being provided with a tapered face on the outer periphery thereof, and said annular member being fitted on said outer periphery so as to be in contact with said tapered face and maintained in lightly pressurized contact with the pin link plate and the roller link plate.

2 Claims, 4 Drawing Figures

OIL-SEALED ROLLER CHAIN

This is a continuation of application Ser. No. 056,841 filed July 12, 1979.

FIELD AND BACKGROUND OF THE INVENTION

The present invention relates to a roller chain for use in motorcycles and the like, and more particularly to an improvement of a roller chain with good sealability of oil contained therein.

PRIOR ART

In conventional roller chains, as shown in FIG. 1, the lubricating oil, contained between the pin 3 and the bushing 5, is generally sealed by fitting an elastic annular member 4 between the pin link plate 1 and the roller link plate 2 on each end of said pin 3. The annular member is maintained in lightly pressurized contact with said link plates.

Such conventional structure is, however, defective in that, in comparison with an ordinary roller chain not equipped with such annular member wherein the driving force transmitted to the roller chain is applied to the pin 3 as a shearing force because of the reduced distance between said pin link plate 1 and roller link plate 2, the pin 3 is additionally subjected to a bending force due to the increased distance between said link plates caused by the presence of said annular member 4 therebetween. This results in an accelerated metal fatigue.

Also in the conventional roller chain shown in FIG. 1, the link plates 1 and 2 move with respect to each other when the roller chain engages with a sprocket, and the annular member 4 moves together undecidedly with either one of said link plates 1 and 2. For this reason, the surfaces of both of the pin link plate 1 and the roller link plate 2 coming into contact with said annular member 4 have to be of a sufficiently smooth finish.

SUMMARY OF THE INVENTION

According to the present invention, there is provided a roller chain capable of preventing the leak of oil sealed in the space between the pin and the bushing and also of eliminating the above-mentioned drawbacks of the conventional roller chain, the above-mentioned objects being achieved in the present invention by extending the bushing on both ends thereof in a tapered form or in a bullet-head form, fitting the aforementioned elastic annular members on the outer periphery of thus extended portions of the bushing and maintaining the pin link plate and the roller link plate in contact with said annular member at such a light pressure as not to cause the fatigue or breakage of said annular member.

Accordingly, the object of the present invention is to provide a roller chain having an elastic annular member being fitted about each end of the pin and between the pin link plate and the roller link plate for sealing lubricating oil present in the space between the pin and the bushing, which comprises a bushing extended on each end thereof so as to form an extended portion projecting outwards from the roller link plate by a length slightly smaller than, preferably of from three quarters to four-fifths of, the thickness of said elastic annular member, said extended portion being provided with a tapered face on the outer periphery thereof, and said annular member being fitted on said outer periphery so as to be in contact with said tapered face and maintained in lightly pressurized contact with the pin link plate and the roller link plate.

The various features of novelty which characterize the invention are pointed out with particularity in the claims annexed to and forming a part of this disclosure, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
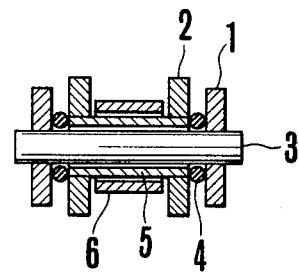
FIG. 1 is a cross-sectional view, corresponding to the line A—A of FIG. 2, of a conventional roller chain provided with elastic annular members.
Figure 2:
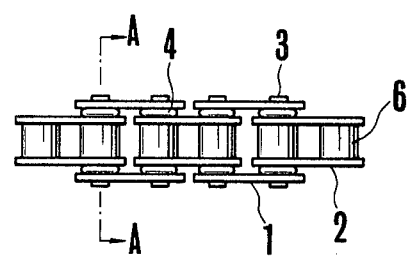
FIG. 2 is a plan view of the roller chain of the present invention.
Figure 3:
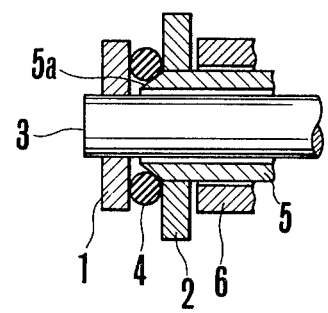
FIG. 3 is an enlarged partially cutaway cross-sectional view taken along the line A—A in FIG. 2.

As shown in FIGS. 2 and 3, the annular member 4 is molded with rubber or a plastic material into an annular form having a substantially circular cross section so as to form point contacts with component members to be explained hereinbelow, and is loosely fitted on the outer end portion of the pin 3 located between the pin link plate 1 and the roller link plate 2. On the other hand, the bushing 5 fitted between the pin 3 and the roller 6 is extended at each end thereof so as to project outwardly from said roller link plate 2 by a length somewhat smaller than the diameter of the cross section of said elastic annular member 4, said projecting portion being provided on the outer periphery thereof with tapered face 5a. Said annular member 4 is fitted on said tapered face 5a so as to be maintained in contact therewith and to be contacted by the pin link plate 1 and the roller link plate 2 under a light pressure not causing the fatigue or breakage of said annular member.

Said elastic annular member 4 is employed to retain and seal, within a space defined by the internal periphery of said annular member 4 and the internal wall of the pin link plate 1, the lubricating oil present in the space between the pin 3 and the bushing 5. Naturally, said annular member also functions to provide the roller chain with satisfactory flexibility. Said annular member is provided with substantially circular cross section in order to minimize the contact area thereof with the pin link plate 1, roller link plate 2 and bushing 5 thereby allowing free mutual movement to said link plates 1 and 2.

Figure 4:
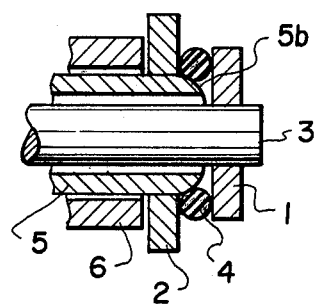
FIG. 4 is an enlarged partially cut-away cross-sectional view, similar to that of FIG. 3, of an alternate embodiment of the inventive arrangement.

Furthermore, the above-mentioned tapered face 5a may be replaced by parabolic convex face 5b as shown in FIG. 4, whereby the longitudinal cross section of the projecting portion of the bushing 5 assumes a bullet-head form.

As described in the foregoing, the extended projecting portion of the bushing 5 is provided on the outer periphery thereof with a tapered face on which the annular member 4 is fitted in the above-mentioned manner, whereby said extended portion of the bushing 5 provides an additional support to the pin 3 in a space between the pin link plate 1 and the roller link plate 2 spaced by a distance substantially equal to the diameter of the cross section of said annular member 4. As shown in FIGS. 3 and 4, the end of the extended portion of bushing 5 does not contact the adjacent pin link plate 1.

Consequently, although a bending force is applied to the end portions of the pin 3 due to the increased space resulting from the presence of said annular member 4, the pin 3 itself is reinforced by said extended portions of the bushing 5 which thus function also as reinforcing tubes. In other words, said extended portions function to increase the effective contact area between the pin 3 and the bushing 5 and to disperse the frictional force or strain therebetween over thus increased area thereby reducing the abrasion per unit area and increasing the strength and durability of the pin.

Furthermore, in the above-explained structure of the present invention, the tapered face 5a of the bushing 5 becomes engaged to a certain degree with the annular member 4, whereby the annular member 4 tends to remain stationary with respect to the roller link plate 2 while to glide with respect to the pin link plate 1 during the movement of the roller chain. Therefore, the annular member moves only with respect to the pin link plate 1 so that the smooth surface finish is required only on the surface of said pin link plate coming into contact with the annular member but not on the surface of the roller link plate. For this reason there is provided another advantage of a reduced production cost.

While specific embodiments of the invention have been shown and described in detail to illustrate the application of the principles of the invention, it will be understood the invention may be embodied otherwise without departing from such principles.

What is claimed is:

1. A roller chain of the type having an elastic annular member fitted adjacent each end of a pin and between a pin link plate and a roller link plate for sealing lubricating oil present in the space between the pin and a bushing, which comprises the bushing being extended on each end thereof so as to form an extended portion projecting outwards from the roller link plate, said extended portion being provided with a tapered face on the outer periphery thereof, the annular member being fitted on said outer periphery so as to be in contact with said tapered face and maintained in lightly pressurized contact with the pin link plate and the roller link plate, and said extended portion of the bushing being projected by a length slightly smaller than, preferably of from three quarters to four-fifths of, the diameter of the cross-section of said elastic annular member.

2. A roller chain according to claim 1, wherein said extended portion of the bushing is provided with a parabolic convex face whereby the longitudinal cross section of the projecting portion of the bushing assumes a bullet-head form.

* * * * *